United States Patent [19]

Cowan et al.

[11] Patent Number: 5,363,918

[45] Date of Patent: Nov. 15, 1994

[54] WELLBORE SEALING WITH UNSATURATED MONOMER SYSTEM

[75] Inventors: Kenneth M. Cowan, Sugar Land; Arthur H. Hale, Houston, both of Tex.

[73] Assignee: Shell Oil Company, Houston, Tex.

[21] Appl. No.: 102,035

[22] Filed: Aug. 4, 1993

[51] Int. Cl.⁵ .................... E21B 33/138; E21B 33/14
[52] U.S. Cl. .................... 166/295; 166/293; 166/300; 175/65; 507/136; 507/143
[58] Field of Search ............ 166/292, 294, 295, 300, 166/293; 175/65; 507/136, 137, 140, 143, 110

[56] References Cited

U.S. PATENT DOCUMENTS

| | | |
|---|---|---|
| 2,191,312 | 2/1940 | Cannon . |
| 2,822,873 | 2/1958 | Harmsen et al. . |
| 3,114,419 | 12/1963 | Perry et al. . |
| 3,368,900 | 2/1968 | Burg . |
| 3,374,834 | 3/1968 | Ramos et al. ............ 166/294 X |
| 3,380,831 | 4/1968 | Cohen . |
| 3,499,491 | 3/1970 | Wyant et al. . |
| 3,557,876 | 1/1971 | Tragesser . |
| 3,594,410 | 7/1971 | Cohen . |
| 3,695,355 | 10/1972 | Wood et al. .............. 166/295 |
| 3,964,921 | 6/1976 | Persinski et al. . |
| 4,163,809 | 8/1979 | McGinniss et al. . |
| 4,174,974 | 11/1979 | Fondriest . |
| 4,183,406 | 1/1980 | Lundberg et al. .......... 166/295 |
| 4,481,258 | 11/1984 | Sattler et al. . |
| 4,547,298 | 10/1985 | Novak . |
| 4,560,812 | 12/1985 | Blytas . |
| 4,664,843 | 5/1987 | Burba, III et al. . |
| 4,674,574 | 6/1987 | Savoly et al. . |
| 4,721,161 | 1/1988 | Richardson et al. ......... 166/295 |
| 4,722,947 | 2/1988 | Thanawalla et al. . |
| 4,722,976 | 2/1988 | Ceska . |
| 4,745,138 | 5/1988 | Thanawalla et al. . |
| 4,756,761 | 7/1988 | Philip et al. . |
| 4,760,882 | 8/1988 | Novak . |
| 4,780,220 | 10/1988 | Peterson . |
| 4,874,675 | 10/1989 | Ceska . |
| 4,897,119 | 1/1990 | Clarke . |
| 5,007,489 | 4/1991 | Enright et al. . |
| 5,020,598 | 6/1991 | Cowan et al. . |
| 5,058,679 | 10/1991 | Hale et al. . |
| 5,073,197 | 12/1991 | Majumdar et al. . |
| 5,082,499 | 1/1992 | Shen . |
| 5,084,102 | 1/1992 | Brouns et al. . |
| 5,091,349 | 2/1992 | Alpert et al. . |
| 5,106,422 | 4/1992 | Bennett et al. . |
| 5,133,806 | 7/1992 | Sakamoto et al. . |
| 5,161,470 | 11/1992 | Dobozi et al. . |
| 5,166,109 | 11/1992 | Alpert et al. . |
| 5,168,008 | 12/1992 | Yoshida et al. . |
| 5,248,665 | 9/1993 | Hale et al. ............ 507/136 |
| 5,307,877 | 5/1994 | Cowan et al. ............ 175/65 X |

FOREIGN PATENT DOCUMENTS

| | | |
|---|---|---|
| 85-144069/24 | 10/1983 | Japan . |
| 86-103767/16 | 8/1984 | Japan . |
| 23630E/12 | 4/1979 | Russian Federation . |

*Primary Examiner*—George A. Suchfield

[57] ABSTRACT

A drilling and cementing process wherein a drilling fluid containing a proton acceptor metal compound component is utilized and thereafter combined with a water-soluble monomer having polymerizable unsaturated groups to give a cementitious slurry which is thereafter used in a wellbore cementing operation. There is thus provided a cementitious slurry comprising a drilling fluid, i.e., at least water and drill solids, proton acceptor metal compound component and water-soluble monomeric component having polymerizable unsaturated groups.

17 Claims, No Drawings

WELLBORE SEALING WITH UNSATURATED MONOMER SYSTEM

BACKGROUND OF THE INVENTION

This invention relates to well drilling and cementing operations.

The general procedure of drilling an oil or gas well includes drilling a borehole using a drilling fluid. Subsequent to drilling the borehole, casing is run into the well preparatory to placing a cement in the annulus between the outside of the casing and the borehole wall. In order to obtain a good cementing job it is necessary to displace substantially all of the drilling fluid or mud in the annulus with cement.

This necessity arises from the fact that undisplaced mud and filter cake become a source of unsuccessful cement jobs since drilling fluids and cements are usually incompatible. Undisplaced drilling fluid is not a reliable sealant to isolate zones in the annulus and is not a good structural support for the casing. Thus, most water-based muds will adversely change the setting time and compressive strength of the cement. Also, most cements will flocculate and thicken most water-based muds. As the cement is pumped out of the bottom of the casing and up the annulus, it may form flow channels through blocking sections of flocculated drilling mud. In addition, undisplaced filter cake can prevent cement from bonding to the formation and becomes a source of the flow channels.

The drilling industry has sought to overcome these problems by using a variety of techniques to displace the drilling fluid with cement, e.g., utilization of turbulent flow regimes, casing movement (reciprocal/rotation), casing equipment (centralizers, flow diverters, and mud scratchers), spacers and special wash fluids while cementing, but these have had limited success.

Even wash fluids are incapable of removing all of the filter cake since it is at least partially adhered rather tightly to the wall of the wellbore. In addition, wellbores are frequently irregularly shaped with large sections which become filled with drilling fluid. Fluid occupying such irregularly shaped or enlarged sections is often out of the main fluid flow stream in the borehole and is therefore difficult to remove.

Even greater cementing difficulties are encountered with extended reach boreholes and slimhole wells with major problems arising in connection with running casings, displacement of mud and centralization of the casing due to the restricted annulus. When a poor cementing job results due to these problems it may be necessary to perforate the casing and squeeze cement under high pressure through the perforations into the annulus and try to fill the zones that were not properly cemented initially. Even this may not be successful and can result in eventual abandonment of the hole. For one thing, the drilling mud and filter cake resulting therefrom, and conventional cements are simply not compatible.

In addition, many formations have high calcium ion content which creates problems with drilling fluids.

Finally, disposal of what drilling fluid can be successfully removed from a borehole presents its own problems.

Hence, incompatibility of drilling and cementing fluids remains a problem. Even if, through extraordinary efforts, the compatibility problems are mitigated, a Portland cement composition is rigid and not tolerant of flexing. Also, while generally viewed as a strong, hard substance, in fact Portland cement has limited tensile strength.

Polymers are broadly known for use in oilfield drilling and production operations. Clarke, U.S. Pat. No. 4,897,119 (Jan. 30, 1990) discloses using a small amount of a low molecular weight polymer as a dispersant for blast furnace slag in a cement slurry.

Novak, U.S. Pat. No. 4,547,298 (Oct. 15, 1985) and Novak, U.S. Pat. No. 4,760,882 (Aug. 2, 1988), disclose primary cementing using a drilling fluid containing a polymeric material which is hardened with a chemical initiator and, optionally, radiation. Perry et al, U.S. Pat. No. 3,114,419 (Dec. 17, 1963) discloses radiation copolymerization in a wellbore of an alkylidene bisacrylamide and an ethylenic monomer as an improvement over chemical polymerization initiators.

Ionomers are known polymeric compositions which have been available since the 1950's. In recent years they have found a utility in applications such as tooth fillings as described, for instance, in Japanese patent 85-144069/24 (04.05.85).

SUMMARY OF THE INVENTION

It is an object of this invention to avoid compatibility problems between drilling fluids and cements.

It is a further object of this invention to provide compositions for universal fluids which can be used as drilling muds and then be converted to compatible cementitious slurries.

It is a further object of this invention to convert filter cake and/or undisplaced drilling mud to an integral part of a cement.

It is yet a further object of this invention to provide a cement having good adhesion and sufficient ductility to resist cracking on flexing.

It is yet a further object of this invention to allow cementing in a restricted annulus.

It is a further object of this invention to provide a system operable in high calcium ion situations; and It is yet a further object of this invention to avoid disposal problems associated with used drilling muds.

In accordance with one embodiment of this invention there is provided a method for drilling and cementing a well comprising carrying out a drilling operation with an aqueous drilling fluid, thereafter combining the thus-used drilling fluid with a water-soluble monomer having polymerizable unsaturated groups to produce a cementitious slurry, the slurry also comprising a metal oxide which is a proton acceptor, and thereafter introducing the cementitious slurry into a wellbore to perform a cementing operation.

In accordance with another embodiment of this invention there is provided a method for drilling and cementing a well comprising carrying out a drilling operation with a drilling fluid comprising water and a metal oxide which is a proton acceptor, thus laying down a filter cake; thereafter contacting the filter cake with a water-soluble monomer having polymerizable unsaturated groups to produce a set filter cake; and thereafter introducing a cementitious slurry into a wellbore to perform a cementing operation.

DETAILED DESCRIPTION OF THE INVENTION

The present invention avoids compatibility problems, reduces drilling mud disposal problems and provides a more flexible cement ideally suited for applications involving a restricted annulus.

Definitions

By "water-soluble" as it refers to the monomer is meant a monomer having at least some water solubility and is intended to encompass both completely soluble monomers in that they will dissolve essentially completely in water under the temperature and concentration conditions employed as well as partially soluble monomers of sufficient solubility that at least 5 grams will dissolve in 100 grams of water at room temperature.

By "segment" as it refers to the resulting polymers is meant that portion of a polymer molecule having its origin in the monomer.

As used herein, the term "universal fluid" means a composition suitable for drilling which also contains a component possessing cementitious potential, which on subsequent combination with a second component, forms a cementitious slurry.

By "cementitious slurry" is meant an aqueous slurry which will harden to a solid, i.e., to a cement.

By "direct fluid contact" between a displacement fluid and the polymeric cementitious slurry is meant that the displacement fluid directly contacts an upper surface of a column of cementitious slurry as opposed to having a solid wiper plug and/or spacer fluid disposed between the cementitious slurry and the displacement fluid. By "direct fluid contact" between the cementitious slurry and drilling fluid or mud is meant that the cementitious slurry directly contacts an upper surface of a column of drilling fluid or mud as opposed to having a wiper plug with a rupturable diaphragm disposed between the cementitious slurry and the drilling fluid or mud.

The term "pipe" means either a casing or a liner.

The term "primary cementing" refers to any cementing operation wherein a cementitious slurry is passed into an annulus surrounding a pipe and thus encompasses both the cementing of casings wherein the annulus is between the casing and the borehole wall and the cementing of liners where the annulus includes an annulus between the liner and the casing.

As used herein "down" or "bottom" as it relates to a drill string or casing, means in a direction toward the farthest reach of the borehole even though in some instances the borehole can be disposed in a horizontal position. Similarly, "up" or "top" means back toward the beginning of the borehole.

By "barrel" is meant a standard 42-gallon petroleum barrel.

Monomer

The water-soluble monomer component can be any polymerizable component with a terminal unsaturated group. Generally, it is an ester of the formula

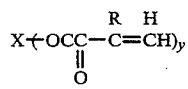

where X is a polyvalent metal or polyvalent organic group, R is H or a 1-3 carbon atom allyl group, and y is an integer equal to the valence of X. The ester can hydrolyze to the acid on contact with water.

Suitable water-soluble monomers include polyfunctional unsaturated organic acid esters such as: polyethylene glycol dimethacrylate, polyethylene glycol diacrylate, and highly alkoxylated triacrylates such as ethoxylated, ethoxylated propoxylated and propoxylated triacrylates; and salts of polyfunctional unsaturated organic acids such as zinc diacrylate, modified zinc diacrylate, scorch retarded and modified zinc diacrylate, zinc dimethacrylate, scorch retarded zinc dimethacrylate and zinc monomethacrylate. The starting monomers can be those sold by the Sartomer Company of Exton, Pennsylvania, under the trade name "SARTOMER 252", "SARTOMER 344", "SARTOMER 454", "SARTOMER 9020", or "SARTOMER 9035". In one embodiment, the monomer can consist essentially of a member selected from (1) metal salts of unsaturated organic acids (2) polyethylene glycol acrylates and (3) polyethylene glycol methacrylates.

The molecular weight of the monomers can vary widely so long as the monomers are water-soluble.

Salts of unsaturated, organic acids broadly include monovalent as well as polyvalent metal salts as depicted hereinbelow.

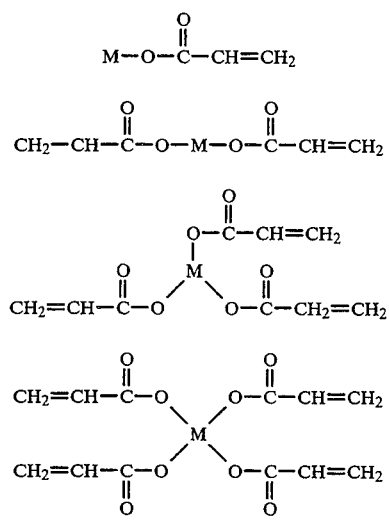

Thus M can be a mono, di, tri, tetra or penta or higher valent metal ion from a basic metal oxide or salt which will react with the acid to form the neutralized acid salt. The unsaturated organic acid can be acrylic or methacrylic for example. The starting materials can be the salt. Alternatively, the acid can be used and neutralization carried out in the system after which the unsaturated salt is polymerized.

Polymerization

While not wishing to be bound by theory, applicants believe the reactions are as follows. The polymerization of unsaturated organic acid salts is depicted hereinbelow.

1. monovalent metal salt or complex

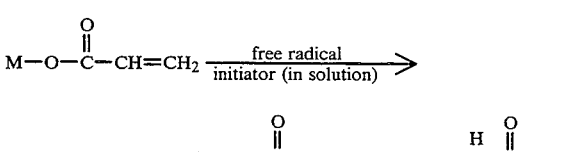

Further reaction can occur at the bond as follows:

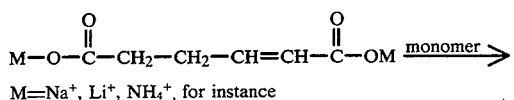

$M = Na^+, Li^+, NH_4^+$, for instance 2. divalent metal salt or complex

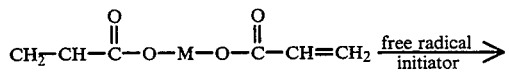

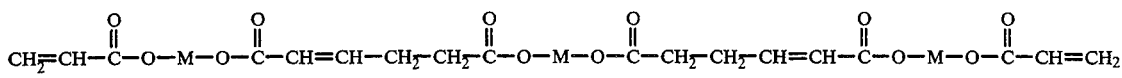

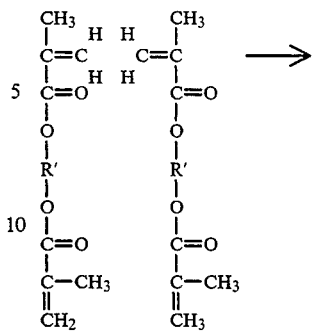

This process can be repeated until all double bonds are reacted. This can result in some branching along the chain as below.

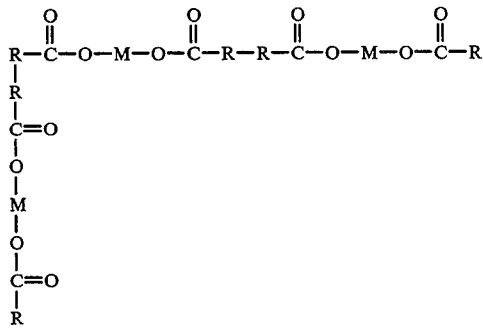

wherein R is the remnant of a monomer unit.

At the internal R groups, branching can occur at the unsaturated bonds.

3. Difunctional organic acid ester, no branching

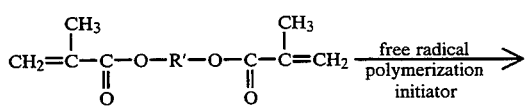

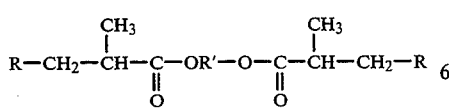

wherein R' is a polyethylene oxide unit $-(-CH_2-CH_2-O-)_m-$ and R is the remnant of a monomer unit. The process continues until all unsaturated carbon bonds are reacted to saturation or until initiation by available free radicals ends the polymerization process.

4. Difunctional organic acid esters, branching

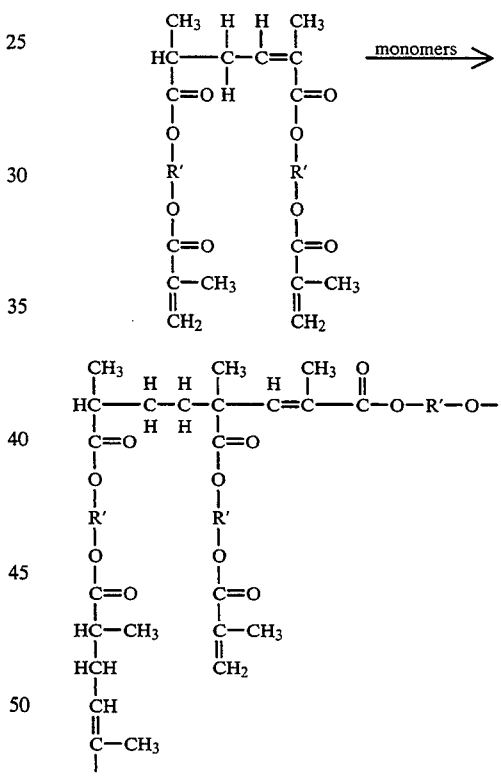

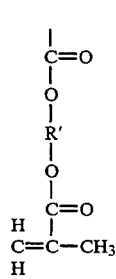

Polymerization Catalyst

A polymerization catalyst or initiator is generally, but not always, used to facilitate the polymerization of the unsaturated monomer. Suitable catalysts include peroxides such as hydrogen peroxide, benzoyl peroxide and persulfates such as sodium and ammonium persulfate.

The catalysts are generally used in an amount within the range of 0.05 to 10 wt %, preferably 0.3 to 6 wt %, more preferably 1 to 5 wt %.

Crosslinked Polymer Formation

This invention utilizes a two-component system. The first component is a metal compound which is a proton acceptor and the second component is a water-soluble monomer having polymerizable unsaturation.

The resulting cement is the water-insoluble reaction product of the metal component which serves as a cementitious component and a polymerized monomer component.

The weight average molecular weights of the final polymer can range from 500 to 5,000,000 but preferably will be in the range of 1,000 to 750,000, most preferably 5,000 to 500,000.

Again, while not wishing to be bound by theory, Applicants believe that when crosslinking occurs, it occurs across the doubled bonded oxygens as follows:

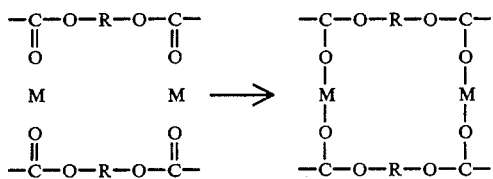

Crosslinking would generally occur after polymerization but could occur at the same time or before polymerization.

Metal Compound

By "metal compound" is meant a proton acceptor, generally a metal oxide such as CaO, MgO, ZnO, alumina or an oxide of manganese. The preferred metal oxides are magnesium oxide and zinc oxide, and most preferably, magnesium oxide. The applicable metal oxides are generally fired at temperatures above 1,000° F. for several hours to reduce chemical activity prior to grinding to a final particle size for use in reacting with the polymer component. Generally, the metal compound component will have a particle size such that it exhibits a surface area within the range of 500 to 30,000 cm$^2$/g, preferably 1500 to 25,000 cm$^2$/g, most preferably 2000 to 20,000 cm$^2$/g.

In instances where it is desired that the metal compound add weight to a drilling fluid, the metal compound is preferably a water-insoluble metal compound with a specific gravity of at least 3.0, preferably at least 3.5. By "insoluble" is meant that less than 0.01 parts by weight dissolves in 100 parts by weight of cold (room temperature) water.

The amount of metal compound initially present in the drilling fluid can vary widely; generally 1–200 lbs/bbl, preferably 20–200 lbs/bbl, most preferably 20–100 lbs/bbl are used. By bbl is mean barrels of total drilling fluid. The total amount of metal compound in the cementitious slurry is generally in the range of 20–600, preferably 100–500, more preferably 150–300 lbs/bbl. By "bbl" here is meant barrels of cementitious slurry. If no additional metal compound is added, the amount based on the barrels of cementitious fluid is actually less due to the addition of the polymer. However, generally additional metal oxide is added between the drilling operation and the cementing operation.

Ratio of Ingredients

The amount of monomer utilized can vary widely depending upon the type of monomer and/or amount of the metal compound; broadly, 10 to 200, preferably 10 to 100, most preferably 10 to 80 wt %, based on the weight of metal oxide, is generally used when a metal compound is used. Stated in terms of lbs/bbl, the monomer is generally utilized in an amount within the range of 10–200 pounds per barrel of cementitious composition, preferably 10–100, more preferably 10–80 lbs/bbl. Generally, amounts towards the upper end of these ranges are used with liquid monomers with less being used with the metal salts. Also, when the metal compound is used, which is generally preferred, amounts toward the lower end of the ranges set out are generally used.

A crosslinked and polymerized network structure exists as a result of the reaction of the proton acceptor and the polymerized or polymerizing monomer, thus giving a strong, solid cement.

Drilling Fluids

The term "drilling fluid" as used herein means water-based fluids or oil-based fluids which contain water (invert emulsions). These drilling fluids further contain a proton acceptor metal compound and at least one other additive such as viscosifiers, thinners, dissolved salts, solids from the drilled formations, solid weighting agents to increase the fluid density, formation stabilizers to inhibit deleterious interaction between the drilling fluid and geologic formations, and additives to improve the lubricity of the drilling fluid.

As used herein the reference to 'water-based drilling fluids' is meant to encompass those drilling fluids having a continuous water phase including fresh water fluids and salt water fluids which may be made from seawater or man-made brine solutions. The water-based fluids can be either essentially pure water or can contain up to 50% oil, i.e., oil in water emulsions. Water-based drilling fluids are preferred over invert emulsions.

It is sometimes desired that the water-based drilling fluids use water-containing dissolved salts, particularly sodium chloride. In these instances, 0.1 to 26 wt %, preferably 3 to 10 wt % sodium chloride may be used. In some instances 5 to 20 wt % may be preferred. One suitable source is to use seawater or a brine solution simulating seawater. Various salts, preferably organic salts, are suitable for use in the drilling fluid used in this invention in addition to, or instead of, NaCl, including, but not limited to, $MgCl_2$, NaBr, KCl, $CaCl_2$, $NaNO_3$, $NaC_2H_3O_2$, $KC_2H_3O_2$, $NaCHO_2$, $CsCHO_2$ and $KCHO_2$ among which sodium chloride is preferred, as noted above. Broadly, such salts can be used, if desired, up to the saturation point under the conditions employed.

Because of the mass provided by the metal compound component these drilling fluids, it is possible in some instances to operate without weighting agents such as barium sulfate (barite).

Another advantage which is of particular importance in some applications is the flexibility concerning the setting time. With a true hydraulic cementitious component, some degree of hardening begins to occur immediately upon contact with water due to hydrolysis. With the cement precursor, the drilling fluid can be stored or used indefinitely and does not begin to set until the second component is added. Even more significantly in some applications is the control over setting time. Even with activators, there is a limit on how quickly Portland cement, for instance, can be caused to set which is a severe limitation in cementing operations where the cementitious slurry is leaching away into thief zones. With the systems of the invention setting times of less than one-half hour are possible through the use of sufficient polymerization catalyst.

The compositions of this invention offer the further advantage in drilling and cementing operations of utilizing as the aggregate, in effect, the drilling mud, thus avoiding the necessity for disposing of large quantities of drilling mud. Finally, the compositions, even though made from a drilling mud which is normally regarded as a poor aggregate for Portland cement, have adequate compressive strength and greatly superior tensile strength and ductility as compared with Portland cement or cements made with slag, pozzolans, or other siliceous cements.

Another advantage of this invention in drilling fluid applications is the ability to construct a drilling fluid wherein most or all of the components also have a cementitious function. This contrasts with Portland cement cementing where most of the components of the drilling fluid have an adverse effect on the cement. The following Table illustrates the uniqueness of such formulations.

is possible to operate the drilling operation utilizing the drilling fluid and thereafter add the monomeric component without diluting the drilling fluid. While the drilling fluid may be diluted for the purpose of adjusting density during or prior to the addition of the monomeric component, such dilution is not necessary to avoid unacceptable viscosity increases. Again, it is possible that in some instances it will be desirable to prepare drilling fluid containing only a portion of the total metal compound component, to carry out the drilling operation, dilute the fluid (optional), add the remainder of the metal compound component and simultaneously or thereafter add the monomeric components and utilize the cement for its intended purpose such as setting a casing.

Conventional Drilling Fluid Additives

Suitable fluid loss additives found in drilling fluids include bentonite clay, carboxymethylated starches, starches, carboxymethyl cellulose, synthetic resins such as "POLYDRILL" by SKW Chemicals, sulfonated lignite, lignites, lignin, or tannin compounds. Weight materials include barite, calcium carbonate, illmenite, titanium dioxide, manganese oxides and hematite, for example. Shale stabilizers that are used in drilling fluids include hydrolyzed polyacrylonitrile, partially hydro-

TABLE A

| | Function | | | |
|---|---|---|---|---|
| | Drilling Fluid | | Cementitious Slurry | |
| Additive | Primary | Secondary | Primary | Secondary |
| Water | Cuttings Carrier | | | |
| Synthetic[1] Polymer | Fluid loss control | | Fluid loss control | |
| Starch[2] | Fluid loss control | Viscosity | Fluid loss control | Viscosity |
| Biopolymer[3] | Viscosity | | Viscosity | — |
| Silicate | Viscosity | Shale stabilizer | Accelerator | — |
| Carbohydrate[4] Polymer | Deflocculant | — | Deflocculant | — |
| Barite[5] | Density | — | Density | Solids for compressive strength |
| Bentonite[6] | Fluid loss | — | Fluid loss control | Solids for compressive strength |
| Clay/Quartz[7] Dust | — | — | Solids | — |
| Metal Compound[8] | Weight | Solids | Cement Component | Solids |
| Monomer | Not present | Not present | Cement Component | — |
| Lime[9] | Shale stabilizer | Alkalinity | Accelerator | Solids |
| Polyalcohol[10] | Shale stabilizer | Fluid loss | Rheological control | Bond Improver |
| NaCl | Shale stabilizer | — | Strength enhancement | — |

[1]Synthetic polymer manufactured by SKW Chemicals Inc. under trade name "POLYDRIL" for instance.
[2]Starch made by Milpark Inc. under the trade name "PERMALOSE", for instance.
[3]"BIOZAN", a biopolymer made by Kelco Oil Field Group, Inc., for instance.
[4]Water-soluble carbohydrate polymer manufactured by Grain Processing Co. under trade name "MOR-REX" for instance.
[5]Barite is $BaSO_4$, a drilling fluid weighting agent.
[6]Bentonite is clay or colloidal clay thickening agent.
[7]Clay/quartz solid dust manufactured by MilWhite Corp. under trade name "REV DUST" for instance.
[8]MgO for instance.
[9]CaO
[10]Polycyclicpolyetherpolyol or a polyglycerol, for instance.

The drilling fluid/cementitious slurry compositions of this invention are relatively tolerant of solids concentration. That is, more dilute cementitious slurries still set up into high strength cements and more concentrated compositions still have a manageable viscosity. Thus, it lyzed polyacrylamide, salts including NaCl, KCl, sodium or potassium formate, sodium or potassium acetate, polyethers and polycyclic and/or polyalcohols.

Viscosifying additives can be used such as biopolymers, starches, attapulgite and sepiolite. Additives are also used to reduce torque. Suitable thinners such as chrome and chrome free lignosulfonates, sulfonated styrene maleic-anhydride and polyacrylate may also be used depending upon the mud type and mud weight. Lubricating additives include nonionic detergents and oil (diesel, mineral oil, vegetable oil, synthetic oil), for instance. Alkalinity control can be obtained with KOH, NaOH or CaO, for instance. In addition, other additives such as corrosion inhibitors, nut hulls etc. may be found in a typical drilling fluid. Of course, drill solids including such minerals as quartz and clay minerals (smectite, illite, chlorite, kaolinite, etc.) may be found in a typical mud.

Polyalcohols

If desired, a polyalcohol can be utilized to improve the bonding of the cement. Suitable polyalcohols are disclosed in Cowan and Hale, U.S. Pat. No. 5,020,598 (Jun. 4, 1991) and Hale and Cowan, U.S. Pat. No. 5,058,679 (Oct. 22, 1991), the disclosures of which are hereby incorporated by reference.

If a polyalcohol is used, it may be desirable in some instances to use one modified with an epoxy resin.

The epoxy resin can be used in an amount sufficient to give 0.5 to 5 wt % material from the epoxy resin incorporated in the epoxy polyethercyclicpolyol. Alternatively, a relatively high epoxy content can be utilized, say 6 to 75, preferably 20 to 45 wt %. Thus, viewed in terms of the polyol, the epoxy component content can vary from 0 to 67 wt % based on the total weight of the polyol.

The initial pressure can be higher when making the higher epoxy material as compared with the initial pressure preferred for the polyetherpolyols in general as disclosed in said Hale and Cowan patent. For instance, the initial pressure can be greater than 180 torr. Generally, the initial pressure will be between 250 and 500, preferably 250–350 torr, i.e., a vacuum, when the starting polyhydric alcohol component is glycerine. If desired, the reaction can be terminated before 1.107 moles of water per mole of polyol reactant are removed. Preferably, the polyhydric alcohol monomer is introduced into the reaction zone in a single addition and the epoxy introduced in a plurality of additions, preferably 2 to 10, most preferably 3 to 6 when utilizing the higher epoxy. Generally, if higher epoxy content materials are being produced, more additions are utilized and the addition of the epoxy could be continuous. With the high epoxy content materials diglycidyl ethers are preferred instead of the tri- and tetraglycidyl ethers.

Another class of polyalcohols is ethoxylated propoxylated alcohols of the following general formula

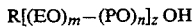

$R[(EO)_m-(PO)_n]_z OH$ where EO = an ethoxy unit
PO = a propoxy unit
R = an alkyl chain of 2–16 carbon atoms, preferably 3–16, most preferably 4–10 carbon atoms. At least one of m or n is greater than 0. In these EO/PO copolymers, m and n are variable and the sum of m plus n determines their number average molecular weight, which ranges from 500 to 15,000, preferably from 600 to 10,000. Mixtures of water soluble and water insoluble alcohols can be used because of the improved interfacial sealing and reduced fluid loss which the combination provides.

Cementing

The metal compound can be used as the sole solid material in the final cementitious slurry or can be used in admixture with hydraulic materials such as blast furnace slag or Portland cement. In one particularly advantageous aspect of this invention, a siliceous material such as Portland cement or blast furnace slag is used as the source of the metal compound. Thus, in effect, a mixture of crosslinked materials is produced in situ.

The cementitious composition of this invention is of particular value for filling and sealing the annulus between a borehole wall and a casing or between casings, particularly where some degree of ductility and/or tensile strength is desired. The polymeric cement has good adhesive properties to the borehole wall and casing and has greater elasticity than is obtained with siliceous hydraulic materials. Upon addition of the second component, an organometal composition is formed having a metal attached to or interlocking (crosslinking) a polymer chain or a monomer which polymerizes or continues to polymerize. Such cements are resistant to cracking under conditions of cyclic loading as are frequently encountered in a wellbore. For similar reasons, the polymeric cementitious composition of this invention are beneficial in cementing liners and tieback casing strings which may otherwise leak due to changes in pressure and temperature in the well during production operations.

Another area where the ductility of the polymeric cement is of special value is in slimhole wells where the annulus is smaller. For instance, the invention is of particular utility where part or all of the annulus between the borehole and a casing is 0.25 inch to 1 inch. Still yet another area where this ductility is important is in extended reach drilling. The term "extended reach" is intended to cover horizontal drilling and any other well drilling operations which are off-vertical a sufficient amount to cause the casing to be displaced by gravity toward one side of the borehole.

In accordance with one aspect of this invention, there is provided a method for drilling and cementing a well comprising preparing a universal fluid by mixing a well fluid or drilling mud and a metal oxide; drilling a borehole with the universal fluid thus laying down a settable filter cake on the walls of the borehole during the drilling of the well and producing a used drilling fluid; adding the monomeric second component to the used drilling fluid and introducing the thus-formed cementitious slurry into the wellbore and into an annulus between the wellbore and a pipe where it hardens and sets up forming a good bond with the filter cake which in time actually hardens itself because of the migration of the monomeric second component into the filter cake. Thus, filter cake, rather than presenting an incompatibility problem, becomes an integral part of the cement. In addition, any drilling fluid which has migrated into holes or enlarged sections along the borehole will similarly set into a solid because of the migration of the monomer into such remaining drilling fluid.

In yet another related embodiment of this invention, universal fluid is utilized in a drilling operation and thereafter the monomer (and, optionally, additional proton acceptor metal compound and/or additives) is gradually added so as to gradually transition the circulating material from a drilling fluid to a cementitious slurry.

Another unique advantage of this invention as it relates to well drilling operations relates to the problems encountered with toleration of calcium ions. Since many cementitious components contain calcium, drilling fluids formulated for use with such cementitious materials must be calcium tolerant. Since the compositions of most embodiments of this invention do not contain any significant amount of calcium ions, the compositions can be used in a drilling fluid system which has not had to be tailored to be tolerant of calcium ions, i.e., a calcium ion sensitive drilling fluid. Yet the composition of this invention can be used in a calcium ion environment.

In all instances, the cementitious compositions produced in accordance with this invention can be used in primary cementing and thereafter additional cementitious material of the invention used in secondary or remedial cementing.

Another feature of this invention is the ability to tailor the rheology of both the drilling fluid and the final cement to the conditions of a particular wellbore. This results from the fact that the use of a metal oxide as the cementitious material gives a final cementitious slurry which is not weakened in the manner that would be the case with Portland cement if the slurry is more dilute. On the other hand, additional metal does not impart extremely high viscosity to the slurry and thus a higher concentration of hydraulic material can be used if desired.

Process and apparatus used to drill and cement are well known. A well is drilled using a hollow drill string having a drill bit with at least one orifice communicating between the inside of the hollow drill string and the outside and located at the lower end of the drill string, thus producing a wellbore. During this drilling, a drilling fluid is circulated down the inside of the drill string and out of the orifice at the lower end thereof. When the drilling is complete, the drill string is withdrawn from the wellbore. A first section of a pipe such as a well casing, generally having a float shoe with an upper sealing surface, is inserted into the wellbore. Additional sections of casing are generally attached sequentially to the first section and the first section is inserted further into the wellbore. Cementing is then carried out by introducing a cementitious slurry into the casing separated from the drilling fluid below and the displacement fluid above by wiper plugs and/or spacer fluids.

In accordance with one embodiment of this invention, drilling fluid, containing monomer necessary to form a cementitious slurry, is pumped down the casing. This may be facilitated by inserting a conventional bottom plug into the casing string, the bottom plug having a longitudinal passage and a rupturable diaphragm at the top, so that it is forced down the casing by he cementitious slurry. Thereafter, a top or second plug can be inserted into the casing string above the column of cementitious slurry, the diaphragm of the first plug ruptured, and the slurry forced up into an annulus between the outside of the casing and the inside of the borehole where, with time, it hardens.

In accordance with another embodiment of this invention, the use of these conventional plugs for separating the cementitious slurry from the drilling fluid is generally not necessary. In this embodiment the drill string is simply removed, a pipe inserted, and the cementitious slurry circulated into the borehole, displacing the drilling fluid by direct fluid contact with the drilling fluid. The cementitious slurry is displaced down the pipe and up into the annulus through direct fluid contact by a displacement fluid thus eliminating the need for spacer fluids and/or wiper plugs and a landing collar.

Dilution

In the preferred method of carrying out this invention, the drilling fluid is utilized and thereafter diluted prior to or during the addition of the monomer and, optionally, more metal compound. Thus, a significant improvement in the operating procedure is provided. This is because the density of the drilling fluid can be chosen in the first place to be sufficient to avoid inflow into the wellbore because of formation pressure but insufficient to rupture the wellbore wall and force fluid out into the formation. Also the concentration can be chosen to give the desired rheology for drilling. By utilizing the dilution and thereafter the addition of the monomer, the cementitious slurry can also have the density and/or rheology tailored to the particular operation the same as the drilling fluid. The dilution can be carried out in either of two ways. First, a vessel containing drilling fluid can simply be isolated and the desired amount of water or other diluent added thereto. In a preferred embodiment, however, the drilling fluid is passed to a mixing zone as a flowing stream and the dilution fluid added "on the fly" to the flowing stream. Thereafter the additional proton acceptor metal compound is added. This avoids highly viscous cementitious slurry compositions and allows all of the pumping to be done with piping and pumps associated with the well rig without the need for pumps designed for pumping cement. This is of particular value in the areas to which this invention is of special utility, offshore drilling rigs where the transportation of additional pumping equipment is particularly inconvenient. Thus, it is possible to tailor the final density of the cementitious slurry, if desired, to a value within the range of 30% less to 70% more than the original density of the drilling fluid, preferably within the range of 15% less to 50% more, most preferably essentially the same, i.e., varying by no more than ±5 weight percent.

The diluent can be the same or different from the liquid used to make the drilling fluid. In one embodiment, both are brine solutions such as seawater. The cementitious compositions of this invention do not suffer the kind of property deterioration from the presence of brine that Portland cement does. The brine tolerance can be a major asset in applications such as offshore drilling where fresh water is not available but brine is.

The unique advantage of universal fluids is that wellbore stabilization, fluid-loss control, and cuttings transport can be realized essentially the same as with conventional drilling fluid systems. However, with the simple presence of the monomer in the subsequent cementitious slurry, the resulting mud-metal compound system will develop strength. Thus, for instance, (1) drilling fluid filter cake deposited while drilling over permeable zones can be converted into an effective sealant by diffusion of monomer or polymerized monomer from the cementitious slurry column; and (2) whole mud that has not been removed from washed-out sections of the hole during displacement will harden with time because of the same kind of diffusion and, therefore, provide an effective sealant and lateral support to the casing.

In areas such as slim hole drilling, the universal fluid of this invention gives the process benefit of avoiding the removal of an incompatible drilling mud and the product benefit of the cement being resistant to cracking on deflection when set.

Filter Cake Setting

In yet another embodiment of this invention the drilling process is carried as described hereinabove with a universal fluid to produce a borehole through a plurality of strata thus laying down a filter cake comprising a metal compound. Prior to the cementing operation a monomer and catalyst are passed into contact with the filter cake, for instance by circulating the monomer down the drill string and up the annulus between the drill string and the filter cake, or else the drill string is removed and the casing inserted and the monomer and preferably a catalyst circulated down the casing and up the annulus so as to polymerize the monomer. The monomer which permeates the filter cake can be polymerized to produce a polymer, and, in addition, the resulting polymer can attach to the metal compound in the filter cake.

Preferably, the circulation is carried out by using the drill string, this being the benefit of this embodiment of the invention whereby the filter cake can be "set" to shut off gas zones, water loss, or to shut off lost circulation in order to keep drilling without having to remove the drill string and set another string of casing. This can also be used to stabilize zones which may be easily washed-out (salt zones wherein the salt is soluble in water, for instance) or other unstable zones. After the drilling is complete the drilling fluid is then diluted, the drill string removed, and the cementing carried out as described hereinabove.

In another embodiment of this invention, the monomer is incorporated into the whole mud system which is used to drill the hole. The monomer is deposited in the wall cake through fluid loss to permeable formations. Once the hole interval is drilled and cased, a primary cement job is pumped. The monomer in the wall cake and in any bypassed mud is polymerized by a free radical reaction triggered by components in the primary cement. When polymerized, the wall cake and whole mud will bond to the formation, cement and/or casing and develop compressive strength. Alternatively, the free radical generator can be circulated into contact with the filter cake and/or bypassed mud prior to cementing. The salt monomers are particularly well suited for use in this embodiment. Generally, the monomer will be used in this embodiment in an amount within the range of about 5 to 100, preferably 25 to 180, more preferably 30 to 50 lbs/bbl, based on the total of drilling fluid and monomer. The metal compound which is a proton acceptor can be present or absent from the drilling fluid in this embodiment.

Conventional spacers may be used in the above described sequence. Also, any left over fluid having monomer therein may be displaced out of the borehole by the next fluid and/or a spacer fluid and stored for subsequent use, or disposal by deactivating the catalyst.

Blast Furnace Slag Cementing

In another embodiment of this invention, the drilling is done using a drilling fluid containing a metal compound to lay down a filter cake which is set with a monomer as described above and thereafter the cementing is done with a cementitious slurry comprising blast furnace slag, water and an accelerator.

Suitable activators for blast furnace slag hydration include sodium silicate, sodium fluoride, sodium silicofluoride, magnesium silicofluoride, magnesium hydroxide, magnesium oxide, zinc silicofluoride, zinc oxide, zinc carbonate, titanium carbonate, sodium carbonate, potassium sulfate, potassium nitrate, potassium nitrite, potassium carbonate, sodium hydroxide, potassium hydroxide, copper sulfate, lithium hydroxide, lithium carbonate, calcium oxide, calcium nitrate, calcium nitrite, calcium hydroxide, sodium sulfate and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone. Preferably, about 1 to 20 lbs/bbl of caustic soda, more preferably 2 to 6 lbs/bbl of caustic soda are used in conjunction with from 2 to 50 lbs/bbl, preferably 2 to 20 lbs/bbl of soda ash. The references to "lbs/bbl" means pounds per barrel of final cementitious slurry.

The preferred blast furnace slag used in this embodiment of the invention is a high glass content slag produced by quickly quenching a molten stream of slag at a temperature of between 1400° C. and 1600° C. through intimate contact with large volumes of water. Quenching converts the stream into a material in a glassy state having hydraulic properties. At this stage, it is generally a granular material that can be easily ground to the desired degree of fineness. Silicon dioxides, aluminum oxides, iron oxides, calcium oxide, magnesium oxide, sodium oxide, potassium oxide, and sulphur are some of the chemical components in slags. Preferably, the blast furnace slag used in this invention has a particle size such that it exhibits a Blaine specific surface area between 2,000 $cm^2/g$ and 15,000 $cm^2/g$ and more preferably, between 3,000 $cm^2/g$ and 15,000 $cm^2/g$, even more preferably, between 4,000 $cm^2/g$ and 9,000 $cm^2/g$, most preferably 4,000 $cm^2/g$ and 8,500 $cm^2/g$. An available blast furnace slag which fulfills these requirements is marketed under the trade name "NEWCEM" by the Blue Circle Cement Company. This slag is obtained from the Bethlehem Steel Corporation blast furnace at Sparrows Point, Md.

A usual blast furnace slag composition range in weight percent is: $SiO_2$, 30–40; $Al_2O_3$, 8–18; CaO, 35–50; MgO, 0–15; iron oxides, 0–1; S, 0–2 and manganese oxides, 0–2. A typical specific example is: $SiO_2$, 36.4; $Al_2O_3$, 16.0; CaO, 43.3; MgO, 3.5; iron oxides, 0.3; S, 0.5; manganese oxides, <0.1.

Blast furnace slag having relatively small particle size is frequently desirable because of the greater strength it imparts in many instances to a final cement. Characterized in terms of particle size the term "fine" can be used to describe particles in the range of 4,000 to 7,000 $cm^2/g$ Blaine specific surface area. Corresponding to 16 to 31 microns in size; "microfine" can be used to describe those particles in the 7,000 to 10,000 $cm^2/g$ range that correspond to particles of 5.5–16 microns in size and "ultrafine" can be used to describe particles over 10,000 $cm^2/g$ that correspond to particles 5.5 microns and smaller in size. Small particle size blast furnace slag is available from Geochem under the trade name "MICROFINE MC 100", from Blue Circle Cement Company, and from Koch Industries, Tulsa, Okla. The Koch product has a Blaine specific surface area of 10,040 $cm^2/g$ and is sold under the trade name "WELLCEM".

However, it is very time consuming to grind blast furnace slag to these particle sizes. It is not possible to grind blast furnace slag in a manner where particles are entirely one size. Thus, any grinding operation will give a polydispersed particle size distribution. A plot of particle size versus percent of particles having that size would thus give a curve showing the particle size distribution.

In accordance with a preferred embodiment of this invention a blast furnace slag having a polydispersed particle size distribution exhibiting at least two nodes on a plot of particle size versus percent of particles in that size is utilized. It has been found that if only a portion of the particles are in the ultrafine category, the remaining, indeed the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25 wt % would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the microfine or ultrafine range. Thus, only a minority, i.e., as little as 4 wt % of the slag, would need to be ground to the ultrafine particle size. Generally, 5 to 25%, more preferably 5 to 8% can be ground to the ultrafine particle size; the remainder can be ground in a normal way, thus giving particles generally in a size range of greater than 11 microns, the majority being in the 11 to 31 micron range.

Mixed Metal Hydroxide

Mixed metal hydroxides can be used in the drilling fluid to impart thixotropic properties. In such instances, a thinner such as a lignosulfonate is preferably added before adding polymer. The mixed metal hydroxides provide better solids suspension. This, in combination with the settable filter cake provided in the technique of this invention greatly enhances the cementing in a restricted annulus, for instance.

The mixed metal hydroxides are particularly effective in muds containing clay such as sodium bentonite in addition to the metal oxide. Preferred systems thickened in this way contain from 1-20 lbs/bbl of clay such as bentonite, preferably 2-15 lbs/bbl, most preferably 7 to 12 lbs/bbl. The mixed metal hydroxides are generally present in an amount within the range of 0.1 to 2 lbs/bbl of drilling fluid, preferably 0.1 to 1.5 lbs/bbl, most preferably 0.7 to 1.2 lbs/bbl. A more detailed description of mixed metal hydroxides can be found in Burba, U.S. Pat. No. 4,664,843 (My. 12, 1987).

EXAMPLES

In the following Examples drilling muds were admixed with varying amounts of a proton acceptor metal compound and an unsaturated monomer. In each instance the metal compound was hard, burned magnesium oxide sold under the trade name "MAGCHEM 10 CR" by the Martin Marietta Company. The various unsaturated monomers are identified in each Example. At the beginning of each Example the composition of the base drilling fluid is given.

The resulting compositions were tested in a Halliburton Ultrasonic Cement Analyzer for compressive strength and the resulting values are set out in the Tables.

Example 1

The base mud was a salt/lime/polyalcohol mud having the following specific composition:

10 wt % NaCl brine used in an amount sufficient to give one barrel total
20 lbs/bbl bentonite,
25 lbs/bbl "REV DUST"[1]
4 lbs/bbl lime
4 lbs/bbl "MOR-REX"[2]
6 lbs/bbl "PERMALOSE"[3]
6 lbs/bbl "POLYDRIL"[4]
10 volume percent polyalcohol[5]

[1]Clay/quartz solid dust manufactured by MilWhite Corp. under trade name "REV DUST"; used to simulate drill solids in actual drill fluids.
[2]Water-soluble carbohydrate polymer manufactured by Grain Processing Co. under trade name "MOR-REX".
[3]Starch made by Milpark Inc. sold under the trade name "PERMALOSE".
[4]Synthetic polymer manufactured by SKW Chemicals Inc. under trade name "POLYDRIL".
[5]A mixture of polyglycerine sold by Hydrafluid Company under the trade name "HF 100".

Final mud density was 12.5 lbs/gal.

TABLE 1

| Run | 1 | 2 | 3 | 4 |
|---|---|---|---|---|
| MgO, ppb | 100 | 100 | 100 | 100 |
| Monomer, ppb | — | 40[1] | 40[2] | 80[1] |
| Time, hrs | Compressive Strength, psi[3] | | | |
| 0 | 0 | 0 | 0 | 0 |
| 24 | 3[4] | 38 | 41 | 68 |
| 48 | 0 | 66 | 71 | 98 |
| 72 | 0 | 87 | 92 | 134 |
| 96 | 0 | 99 | 104 | 156 |
| 120 | 0 | 106 | 114 | 171 |
| 144 | 0 | 109 | 117 | 179 |
| 159 | 0 | 112 | 117 | 187 |

[1]Scorch retarded and modified zinc diacrylate sold under the trade name "SR 633" by the Sartomer Company.
[2]Zinc diacrylate sold under the trade name "SR-111" by the Sartomer Company.
[3]Run at 150° F. and 3000 psi curing conditions.
[4]Represents transient gel strength.

As can be seen, the control Run No. 1, having no monomer, did not set. Runs 2 through 4 show that even with as little as 100 lbs/bbl of the metal compound a cement having significant strength developed.

Example 2

The base mud was a polymer mud having the following specific composition:

10% NaCl brine used in an amount sufficient to give one barrel total
20 lbs/bbl bentonite,
25 lbs/bbl "REV DUST"[1]
4 lbs/bbl lime
4 lbs/bbl "MOR-REX"[2]
6 lbs/bbl "PERMALOSE"[3]
6 lbs/bbl "POLYDRIL"[4]
10 volume percent polyalcohol[5]

[1]Clay/quartz solid dust manufactured by MilWhite Corp. under trade name "REV DUST"; used to simulate drill solids in actual drill fluids.
[2]Water-soluble carbohydrate polymer manufactured by Grain Processing Co. under trade name "MOR-REX".
[3]Starch made by Milpark Inc. sold under the trade name "PERMALOSE".
[4]Synthetic polymer manufactured by SKW Chemicals Inc. under trade name "POLYDRIL".
[5]A mixture of polyglycerine sold by Hydrafluid Company under the trade name "HF 100".

Final mud density was 12.7.

TABLE 2

| Run | 1 | 2 | 3 | 4 | 5 |
|---|---|---|---|---|---|
| MgO, ppb | 0 | 200 | 200 | 200 | 200 |
| Monomer, ppb | 40[1] | 0 | 40[1] | 80[1] | 80[2] |
| Time, hr | Compressive Strength[3], psi | | | | |
| 0 | 0 | 0 | 0 | 0 | 0 |
| 1 | 15[4] | 18[4] | 8[4] | 21[5] | 0 |
| 10 | 0 | 0 | 65 | 199 | 0 |
| 20 | 7 | 0 | 0 | 83 | 0 |
| 30 | 0 | 0 | 0 | 60 | 0[6] |
| 40 | 0 | 0 | 0 | 77 | 0 |

TABLE 2-continued

| Run | 1 | 2 | 3 | 4 | 5 |
|-----|---|---|---|---|---|
| 50  | 0 | 0 | 0 | 110 | 0 |
| 60  | 0 | 0 | 0 | 127 | 0 |
| 70  | 0 | 0 | 229 | 290 | 95 |
| 80  | 0 | 0 | 242 | 296 | 101 |
| 90  | 0 | 0 | 275 | 322 | 140 |
| 100 | 0 | 0 | 290 | 328 | 166 |
| 120 | 3 | 0 | 328 | 368 | 210 |
| 140 | 0 | 21 | 345 | 386 | 283 |
| 160 | 0 | 18 | 350 | 386 | 314 |
| 180 | 0 | 16 | 350 | 386 | 342 |
| 200 | 0 | 16 | 350 | 392 | 359 |
| 256 | 0 | 16 | 356 | 392 | 389 |

[1]Zinc dimethylacrylate sold under trade name "SR 365" by Sartomer Company.
[2]50/50 mixture of "SR 365" and highly alkoxylated triacrylate sold under the trade name "Sartomer 9035" by the Sartomer Company.
[3]Run at 150° F. and 3000 psi curing conditions.
[4]Reflects gels strength
[5]Reflects gel strength; at 21.3 hours the value was 0.
[6]At one point a value of 13 was exhibited indicating gel strength being observed.

As can be seen, neither the monomer alone (control 1) nor the metal compound alone (control 2) produced a composition which would set into a cement. As Runs 3 through 5 show, the two-component system of this invention exhibited substantial strength development.

Example 3

The base mud was a polymer mud having the following specific composition:
20 lbs/bbl bentonite,
25 lbs/bbl "REV DUST"[1]
4 lbs/bbl lime
4 lbs/bbl "MOR-REX"[2]
6 lbs/bbl "PERMALOSE HT"[3]
6 lbs/bbl "POLYDRIL"[4]
10 volume percent polyalcohol[5]

[1]Clay/quartz solid dust manufactured by MilWhite Corp. under trade name "REV DUST"; used to simulate drill solids in actual drill fluids.
[2]Water-soluble carbohydrate polymer manufactured by Grain Processing Co. under trade name "MOR-REX". [3]Starch made by Milpark Inc. sold under the trade name "PERMALOSE". [4]Synthetic polymer manufactured by SKW Chemicals Inc. under trade name "POLYDRIL". [5]A mixture of polyglycerine sold by Hydrafluid Company under the trade name "HF 100".

Final mud density was 12.5 lbs/bbl; mud properties: fluid loss at 200° F., 6.8 mls, PV equaled 16, YP equaled 5.

TABLE 3

| Run | 1 | 2 | 3 | 4 |
|-----|---|---|---|---|
| MgO, ppb | 178.6 | 178.6 | 178.6 | 178.6 |
| Monomer, pbb | 10[1] | 20[1] | 30[1] | 40[1] |
| Time, hrs | Compressive Strength[2], psi | | | |
| 0   | 0 | 0 | 0 | 0 |
| 24  | 0 | 0 | 5 | 2 |
| 48  | 0 | 37 | 105 | 118 |
| 72  | 1 | 114 | 244 | 274 |
| 96  | 31 | 217 | 408 | 449 |
| 120 | 57 | 336 | 570 | 614 |
| 144 | 95 | 459 | 723 | 754 |
| 167 | 124 | 560 | 835 | 846 |

[1]Scorch retarded zinc dimethylacrylate sold under the trade name "SR-634" by the Sartomer Company.
[2]Run at 150° F. and 3000 psi curing conditions.

As can be seen, all of these runs of the invention exhibited the development of significant compressive strength and those runs utilizing at least 10 lbs/bbl of the monomer exhibited strengths in excess of 500 psi.

Example 4

The base mud was a mud having the following specific composition:

10 wt % NaCl brine used in an amount sufficient to give one barrel total
20 lbs/bbl bentonite,
25 lbs/bbl "REV DUST"[1]
4 lbs/bbl lime
4 lbs/bbl "MOR-REX"[2]
6 lbs/bbl "PERMALOSE HT"[3]
6 lbs/bbl "POLYDRIL"[4]
10 volume percent polyalcohol[5]

[1]Clay/quartz solid dust manufactured by MilWhite Corp. under trade name "REV DUST"; used to simulate drill solids in actual drill fluids.
[2]Water-soluble carbohydrate polymer manufactured by Grain Processing Co. under trade name "MOR-REX" [3]Starch made by Milpark Inc. sold under the trade name "PERMALOSE". [4]Synthetic polymer manufactured by SKW Chemicals Inc. under trade name "POLYDRIL". [5]A mixture of polyglycerine sold by Hydrafluid Company under the trade name "HF 100".

Final mud density was 12.5.

TABLE 4

| Run | 1 | 2 | 3 | 4 |
|-----|---|---|---|---|
| Weight Agent[1], ppb | 187 | 187 | 187 | 187 |
| Monomer, ppb | 10[2] | 20[2] | 30[2] | 40[2] |
| Time, hrs | Compressive Strength, psi[3] | | | |
| 0   | 0 | 0 | 0 | 0 |
| 64  | 0 | 0 | 0 | 0 |
| 96  | 0 | 13 | 40 | 34 |
| 120 | 0 | 41 | 75 | 65 |
| 144 | 0 | 66 | 107 | 91 |
| 168 | 0 | 90 | 132 | 112 |
| 192 | 4 | 106 | 143 | 122 |
| 216 | 11 | 119 | 158 | 132 |
| 233 | 15 | 126 | 162 | 136 |

[1]50/50 by weight of barite and MgO
[2]Scorch retarded zinc dimethacrylate sold under the trade name "SR 634" by the Sartomer Company.
[3]Run at 150° F., 3000 psi curing pressure.

While this invention has been described in detail for the purpose of illustration, it is not to be construed as limited thereby but is intended to cover all the changes and modifications within the spirit and scope thereof.

What is claimed is:

1. A method for drilling and cementing a well, comprising:
   combining constituents comprising water and a proton acceptor metal compound to produce a drilling fluid;
   thereafter utilizing said drilling fluid in a well drilling operation to form the well, thus producing a used drilling fluid;
   thereafter combining said used drilling fluid with 10 to 200 weight percent based on the weight of said metal compound, of at least one water-soluble monomeric component having polymerizable unsaturated groups to produce a cementitious slurry; and utilizing said cementitious slurry to cement the well.

2. A method according to claim 1 wherein said metal compound is a metal oxide and wherein a peroxide catalyst is also combined with said used drilling fluid.

3. A method according to claim 2 wherein said metal oxide is selected from the group consisting of zinc oxide and magnesium oxide.

4. A method according to claim 2 wherein said monomeric component is represented by the formula

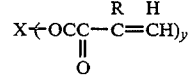

where X is a polyvalent metal or polyvalent organic group, R is H or a 1–3 carbon atom alkyl group and y is an integer equal to the valence of X.

5. A method according to claim 2 wherein additional metal oxide is combined with said used drilling fluid.

6. A method according to claim 2 wherein said drilling fluid is an aqueous drilling fluid containing dissolved solids.

7. A method according to claim 6 wherein said fluid comprises seawater.

8. A method according to claim 1 wherein said cementitious slurry is passed down said borehole and up between an annulus formed by said borehole and a casing to effect primary cementing.

9. A method according to claim 1 wherein said monomeric component is selected from the group consisting of zinc diacrylate, modified zinc diacrylate, scorch retarded and modified zinc diacrylate, zinc dimethacrylate, scorch retarded zinc dimethacrylate, zinc monomethacrylate, polyethylene glycol, dimethacrylate, polyethylene diacrylate, highly alkoxylated triacrylate, and mixtures thereof, and said metal compound is a metal oxide which is selected from the group consisting of magnesium oxide and zinc oxide and wherein a peroxide catalyst is combined with said used drilling fluid which is selected from the group consisting of sodium persulfate and ammonium persulfate.

10. A method according to claim 1 wherein said monomeric component is zinc dimethylacrylate and said metal compound is magnesium oxide.

11. A method according to claim 1 wherein said monomeric component is selected from the group consisting of polyethylene glycol dimethylacrylate and highly alkoxylated triacrylate and said metal compound is magnesium oxide.

12. A method according to claim 1 wherein said cementitious slurry is used in cementing a pipe in a wellbore wherein there is a restricted annulus.

13. A method according to claim 12 wherein said well drilling operation is an extended reach drilling operation or a slim hole drilling operation.

14. A method for drilling and cementing a well, comprising:
   combining constituents comprising water and a proton acceptor metal compound to produce a drilling fluid;
   utilizing said drilling fluid in a well drilling operation to form a borehole, thus laying down a filter cake and producing a used drilling fluid;
   contacting said filter cake with a water-soluble monomeric component having polymerizable unsaturated groups;
   disposing a pipe in said borehole;
   passing a cementitious slurry down said pipe; and
   displacing said cementitious slurry out of said pipe and into an annulus surrounding said pipe with a displacement fluid.

15. A method according to claim 14 wherein said cementitious slurry is prepared by combining a portion of said used drilling fluid with additional proton acceptor metal compound and additional monomer.

16. A method according to claim 15 wherein said displacement fluid is seawater.

17. A method according to claim 16 wherein said proton acceptor metal compound is magnesium oxide.

* * * * *